(12) United States Patent
Emelyanenko et al.

(10) Patent No.: US 12,361,230 B2
(45) Date of Patent: Jul. 15, 2025

(54) METHOD AND SERVER FOR PERFORMING DOMAIN-SPECIFIC TRANSLATION

(71) Applicant: YANDEX EUROPE AG, Lucerne (CH)

(72) Inventors: Dmitry Viktorovich Emelyanenko, d. Goluboye (RU); Maksim Konstantinovich Ryabinin, Kirov (RU)

(73) Assignee: Y.E. Hub Armenia LLC, Yerevan (AM)

( * ) Notice: Subject to any disclaimer, the term of this patent is extended or adjusted under 35 U.S.C. 154(b) by 279 days.

(21) Appl. No.: 18/074,153

(22) Filed: Dec. 2, 2022

(65) Prior Publication Data
US 2023/0177282 A1 Jun. 8, 2023

(30) Foreign Application Priority Data
Dec. 2, 2021 (RU) .............. RU2021135477

(51) Int. Cl.
*G06F 40/58* (2020.01)
*G06F 40/166* (2020.01)
*G06F 40/284* (2020.01)
*G06N 3/08* (2023.01)

(52) U.S. Cl.
CPC ............ *G06F 40/58* (2020.01); *G06F 40/166* (2020.01); *G06F 40/284* (2020.01); *G06N 3/08* (2013.01)

(58) Field of Classification Search
None
See application file for complete search history.

(56) References Cited

U.S. PATENT DOCUMENTS

| | | |
|---|---|---|
| 7,680,647 B2 | 3/2010 | Moore |
| 8,825,469 B1 | 9/2014 | Duddu et al. |
| 9,311,299 B1 | 4/2016 | Petrov et al. |
| 9,552,353 B2 | 1/2017 | Markman et al. |
| 9,606,987 B2 | 3/2017 | Bao et al. |
| 10,635,753 B2 * | 4/2020 | Shin .................... G06N 3/08 |
| 10,769,387 B2 | 9/2020 | Wang et al. |
| 2011/0137636 A1 | 6/2011 | Srihari et al. |

(Continued)

FOREIGN PATENT DOCUMENTS

| | | |
|---|---|---|
| JP | 2019036093 A | 3/2019 |
| RU | 2357285 C2 | 5/2009 |
| RU | 2692049 C1 | 6/2019 |

OTHER PUBLICATIONS

Exel et al.,"Terminology-Constrained Neural Machine Translation at SAP", Published in 2020, https://aclanthology.org/2020.eamt-1.29.pdf.

(Continued)

*Primary Examiner* — Quynh H Nguyen
(74) *Attorney, Agent, or Firm* — BCF LLP

(57) ABSTRACT

Method and server for performing domain-specific translation of sentences. The method includes generating, by the server, an augmented sequence of input tokens based on an input sentence in the first language and a hint inserted into the input sentence. The method includes iteratively generating, using the NN, a sequence of output tokens based on the augmented sequence of input tokens. The method includes generating a second sentence in the second language using the sequence of output tokens, the second sentence including the domain-specific translation of the given input word.

8 Claims, 10 Drawing Sheets

(56) References Cited

U.S. PATENT DOCUMENTS

| | | |
|---|---|---|
| 2014/0330551 A1 | 11/2014 | Bao et al. |
| 2017/0323203 A1 | 11/2017 | Matusov et al. |
| 2017/0364512 A1 | 12/2017 | Han et al. |
| 2018/0052829 A1* | 2/2018 | Lee .................. G06F 40/42 |
| 2020/0117861 A1 | 4/2020 | Bradbury |
| 2020/0233927 A1 | 7/2020 | Berger et al. |
| 2021/0019373 A1 | 1/2021 | Freitag et al. |

OTHER PUBLICATIONS

Dinu et al., "Training Neural Machine Translation To Apply Terminology Constraints", Proceedings of the 57th Annual Meeting of the Association for Computational Linguistics, Florence, Italy, Jul. 28-Aug. 2, 2019, pp. 3063-3068, https://aclanthology.org/P19-1294.pdf.

Alkhouli et al., "On The Alignment Problem In Multi-Head Attention-Based Neural Machine Translation", Proceedings of the Third Conference on Machine Translation (WMT), vol. 1: Research Papers, pp. 177-185, Belgium, Brussels, Oct. 31-Nov. 1, 2018, https://aclanthology.org/W18-6318.pdf.

Post et al., "Fast Lexically Constrained Decoding with Dynamic Beam Allocation for Neural Machine Translation", Proceedings of NAACL-HLT 2018, pp. 1314-1324, New Orleans, Louisiana, Jun. 1-6, 2018, https://aclanthology.org/N18-1119/.

Kai et al., "Alignment-Enhanced Transformer for Constraining NMT with Pre-Specified Translations", The Thirty-Fourth AAAI Conference on Artificial Intelligence (AAAI-20), Published in 2020, https://ojs.aaai.org/index.php/AAAI/article/view/6418/6274.

Lena Voita, "Sequence to Sequence (seq2seq) and Attention", retrieved on the Internet on Dec. 30, 2021 https://lena-voita.github.io/nlp_course seq2seq_and_attention.html.

Russian Search Report dated Nov. 28, 2023 issued in respect of the counterpart Russian Patent Application No. RU 2021138713.

Office Action issued on Mar. 12, 2025 in respect of the related U.S. Appl. No. 18/087,110.

* cited by examiner

METHOD AND SERVER FOR PERFORMING DOMAIN-SPECIFIC TRANSLATION

CROSS-REFERENCE

The present application claims priority to Russian Patent Application No. 2021135477, entitled "Method and Server for Performing Domain-Specific Translation", filed Dec. 2, 2021, the entirety of which is incorporated herein by reference.

FIELD

The present technology relates to machine translation in general and, specifically, to a method and server for performing domain-specific translation.

BACKGROUND

With the growth of users accessing the Internet, a vast amount of Internet based services has surfaced. Such services include, for example, search engine services (such as Yandex™ and Google™ search engines, for example) that allow users to retrieve information by submitting queries to a search engine. Also, social network services as well as multimedia services enable a large variety of users with different social and cultural backgrounds to engage on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language, which the user does not understand, into another one, which she does. This means that translation services are generally designed to provide a translated version of content in a language that the user understands to make that content intelligible for the user.

Translation engines are typically trained based on a large number of examples of parallel sentences between a source language and a target language. However, conventional computer systems providing translation services still have many drawbacks, such as providing correct translation of a rare word or a word specific to a particular domain.

U.S. Pat. No. 9,311,299 discloses a method and system are provided for a part-of-speech tagger that may be particularly useful for resource-poor languages.

SUMMARY

Developers of the present technology have appreciated certain technical drawbacks associated with the existing translation services. It is an object of the present technology to ameliorate at least some of the inconveniences present in the prior art. Developers of the present technology have realized that translation models can be improved to provide better domain-specific translation of sentences.
Neural Machine Translation (NMT)

The use of Neural Networks (NNs) has allowed for significant advances in natural language processing and machine translation. NNs having "transformer" architectures are often used as translation models. This is due at least partially to the transformer architectures' ability to consider broad context introduced with Long Short-Term Memory (LSTM) networks and later, by the attention mechanism.

Broadly speaking, a NMT model observes during training a sequence X of input words Xi (each represented as one or more "input tokens") in the source language and generates its translation Y consisting of output words Yi (each represented as one or more "output tokens"). Training the NMT model requires sentences from a parallel corpus—i.e., a dataset that contains sentences in the source language and the corresponding translations in the destination/target language. The NMT model is generally trained to estimate the probability $P(Y_i|X, Y_{0\_i-1})$ of observing an output word Yi given the input sentence X and all previous output words $Y_{0\_i-1}$ using the maximum likelihood method, for example.

The translations are produced via a process called "decoding". The goal of the decoding process of the NMT model is finding the most probable translation Y expressed as follows:

$$Y = argmax_Y P(Y|X) = argmax_Y \sum_i \log P(Y_i|X, Y_{0,i-1}) \quad (1)$$

given the source sentence X as estimated by the NMT model. However, finding this translation exactly may be computationally intractable, so an approximation in the form of a "beam search" is often used instead. Broadly speaking, in computer science, beam search refers to a heuristic search algorithm that explores a graph by expanding the most promising node in a limited set, and where only a pre-determined number of best partial solutions are kept as candidates.

The translation can be generated iteratively one word at a time. At the start of each iteration, there are k translation prefixes, also referred to as hypotheses. The new top-k hypotheses ranked by respective probability are then selected out of all one-token continuations of previous k prefixes. If one of the selected continuations consists of a special "End-Of-Sequence" (EOS) token, it is considered complete and is excluded from the current top-k. The process can be stopped when the maximum probability of the current incomplete hypotheses is smaller than the probability of the current best complete hypothesis and/or when a pre-determined maximum number of iterations is reached.

With reference to FIG. 8, there is depicted an example of a beam search graph 800 for an NMT model translating an input sentence "a cat sat on a mat". In this example, the NMT model is trained to translate from English to Russian and uses a beam search with a beam size k=2.

The beam search graph 800 includes candidate tokens 801 to 809, and 821 to 828, as well the respective probabilities. A sequence of output tokens 850 is selected from the beam search graph 800 based on the respective log-probabilities, normalized by length. As illustrated, the sequence of output tokens 850 includes the tokens 801 to 809. The token 801 is a "Beginning-Of-Sequence" (BOS) token, the token 802 represents the word "на", the tokens 803 804 805 represent the word "циновке", the tokens 806 807 represent the word "сидела", the token 808 represents the word "кошка", and the token 809 is an EOS token.

Developers of the present technology have realized that such an NMT model suffers from poor translation quality of specific domains of input sentences and/or the inability to translate some rare words correctly. For example, the domain-specific translation of the word "mat" may be "матрас" in Russian, instead of the word "циновка". Further, it should be noted that re-training the NMT model for each domain is computationally expensive, and only a small amount of domain-specific data may be available for such training.

Controllable NMT

Some NMT models are referred to as "controllable" NMT models because they can use some additional "knowledge" about the output sentence to control the produced translations. Control over produced translations may be achieved in different ways.

In some cases, control over the output sentence can be provided by performing a "constrained beam search". Broadly speaking, constrained beam search allocates additional beams for each possible state of the hypothesis. For example, $2^C$ states may be used and represent all possible combinations of C constraints being satisfied or not. In an other example, C+1 states may be used and represent the number of satisfied constraints. The top-k hypotheses can be computed and preserved for next iterations, independently, inside of each allocated beam. If the state of the hypothesis has changed after appending a new token, this hypothesis will only compete for the place in the beam that corresponds to the new state. The termination condition may be only met for the beam that corresponds to the most satisfied constraints and the final translation is taken from this beam.

In other cases, control over the output sentence can be provided by performing Dynamic Beam Allocation (DBA). Broadly speaking, DBA involves splitting a single beam into buckets for each state, and dynamically adjusting each bucket size. The bucket sizes can be initially distributed equally. If a bucket has less hypotheses in it than it was initially allocated with, its size is distributed to other buckets prioritizing the buckets with most satisfied constraints (provided they have enough additional hypotheses to fill this size).

Developers of the present technology gave realized that, while constrained beam search and DBA can provide some control over the generated text, these methods require significant increases in the model's computational intensiveness and often fail at the task by applying constraints to the wrong words. Such errors may occur because so-controlled NMT models do not, in a sense, "know" which words the constraints should be applied to.

In further cases, control over the output sentence may be provided by using dictionary-guided beam search. Broadly speaking, such methods can be used to extract input words that the model attends to while generating the current output word and applying the necessary constraints if these words are a part of a hint. For this method to be implemented, the alignment of the next generated word and the corresponding input word needs to be predicted before the next word is generated.

Developers of the present technology have realized that predicting the next alignment correctly is a difficult task as there is usually not much reference alignment data and the task itself is multimodal. In other words, different alignments could be correct for different continuations of the hypothesis. It can be said that such a model may tend to perform translation multiple times as it does not recognize the previous translations in the generated prefix. Developers have also realized that the difficulty of obtaining correct alignments results in alignment-based methods being prone to similar drawbacks as the constrained beam search and DBA discussed above where the terminology hints may be applied in the wrong place of the sentence and/or not applied completely. Further, because a so-controlled NMT model does not, in a sense, "know" which source words were used in the hints, the model tends to translate them as it does not observe their translations in the generated prefix.

In further cases, control over the output sentence may be provided by using additional data as an input to the model (input-based method). Such NMT models do know that the translation is hinted and are less prone to similar drawbacks that the previously described approaches suffer from. These approaches rely on the NMT model itself to produce the correct output. Developers of the present technology have realized that such models tend to ignore this input, as they do not have any output constraints. This is especially prominent in those cases where the hinted translation is out of training distribution.

Hints from Bilingual Dictionaries (HBD) Framework for Controllable NMT

Developers of the present technology have devised a framework for incorporating "hints" into input sentences in order to provide control over the output sentences generated by the NMT model. Broadly speaking, this framework comprises three main steps: (i) generating training examples, (ii) training the NMT model to identify when constraints should be applied based on these hints, and (iii) applying these constraints during translation.

During the first step, training data is generated where the system determines which reference output words are likely to be translations of which input words to form the ground truth translation hints. For example, an "off-the-shelf" word alignment tool can be used to obtain the ground truth alignments. In some embodiments of the present technology, however, a bilingual dictionary can be used to find possible translations of input words in each training example from a corpus of parallel sentences.

An input sentence can be augmented by, in a sense, "wrapping" a source word with the hint in the form of "<HINT_START> source_words <HINT_SEPARATOR> hinted_translation_words <HINT_END>". In this non-limiting example, a corresponding sequence of tokens comprises inter alia a special start token representing "<HINT_START>", a special translation-hint token representing "<HINT_SEPARATOR>" and a special end token representing "<HINT_END>". The special start token can be sampled randomly out of C pre-defined start tokens, where C is the maximum possible number of hints in one translated sentence. In some embodiments, this randomization may be useful for the NMT model to learn good internal representations for all special tokens. It should be noted that the hinted translation words (domain-specific translations) can be inserted in their dictionary form, while the NMT model can be configured to select the appropriate form later on, when it will be generating the output.

The output words that correspond with the hinted source words are also "wrapped" in a similar manner—i.e., "<HINT_START> translation_words <HINT_END>". Therefore, it can be said that a training example can be augmented by inserting a hint into respective sentences, and the corresponding sequences of tokens generated based on the augmented sentences comprise special tokens that represent that hint.

During the second step, the NMT model is trained. The purpose of this step is to teach the NMT model to use translation hints for identifying when constraints are to be applied on the output.

It should be noted that input sentences can be augmented in the same way during in-use as they are during training. The output generation is unconstrained until the model produces the first "<HINT_START>" special start token that was encountered in the augmented input sentence. After such special start token is produced, the NMT model is constrained to generate only the forms of the domain-specific translation, followed by the "<HINT_END>" special end token. In some embodiments, an "off-the-shelf" lemmer tool may be used to obtain the allowed forms of the domain-specific translation. Then, all the constraints may be lifted until the model produces the next special start token, and so forth. After the model finishes the output generation, special tokens can be removed to obtain the final translation.

Developers of the present technology have realized that using such special start tokens and special end tokens provides the NMT model with positional information. For example, the special start token is used to identify which token needs to be generated after it, so the NMT model can assign a high probability to the correct token. In the same example, the special end token is used to determine that the domain-specific translation of a given word has already been produced.

It should be noted that in some embodiments of the present technology, the NMT model may not be constrained or forced per se to generate a special start token. Thus, constraints will only be applied when special start tokens appear in the beam search "naturally". Developers have realized that not constraining the NMT model to generate special start tokens may reduce the bias to produce domain-specific translations earlier in decoding.

In some embodiments, during decoding, DBA may be applied to the constraints without increasing the translation beam size. Additionally, or alternatively, the probabilities of the correct continuations of the domain-specific translations may be boosted. Developers have realized that a boosting parameter may be tuned/adjusted as the amount of adjustment of the probabilities could be too big for some sentences while being too small for other sentences.

With reference to FIG. 9, there is depicted an example of a beam search graph 900 for an NMT model translating an input sentence "a cat sat on a mat". In this example, the NMT model is trained in accordance with the HBD framework to translate from English to Russian and uses a beam search with a beam size k=2, and a hint for the word "mat", and where the domain-specific translation for the word "mat" is "мampac".

The beam search graph 900 includes candidate tokens 901 to 910, and 921 to 929, as well the respective probabilities. A sequence of output tokens 950 is selected from the beam search graph 900 based on the respective probabilities. As illustrated, the sequence of output tokens 950 includes the tokens 901 to 910. The token 901 is a BOS token, the token 902 represents the word "на", the token 903 represents a special start token, the tokens 904 905 represent the constrained portion of the sequence of output tokens 950 and representing the word "мampace", the token 906 represents a special end token, the tokens 907 and 908 represent the word "*сидела*", the token 909 represents the Word "кошка", and the token 809 is an EOS token.

In the illustrated example, it should be noted that after the token 903, the NMT model is constrained to generate a form of the domain-specific translation of the word "mat". For that reason, in the beam search graph 900, the tokens 904 905 and the tokens 904 924 represent respective forms of the domain-specific translation of the word "mat", and being "мampace" and "мampac", respectively.

It is contemplated that employing the HBD framework for controlling outputs generated by the NMT model may be advantageous to using constrained beam search as the latter one requires increasing the model's computational intensity.

It is contemplated that employing the HBD framework for controlling outputs generated by the NMT model may be advantageous to using conventional DBA, because translation quality using DBA degrades when the number of constraints becomes larger than beam size k. The main reason is that in DBA the constraints are agnostic of what part of the input sentence is being translated and all constraints can become satisfied in the beginning of the translation. This would leave no place in beam for the hypotheses without satisfied constraints and produce bad translations where the hinted translations are located in the wrong place of the output. Moreover, when all constraints are satisfied in DBA, there is nothing that stops the model from generating unwanted translations of the hinted words if it does not believe that the hinted translations correspond to these hinted words. In contrast, the HBD framework allows applying constraints at specific positions of the generated output.

It is contemplated that employing the HBD framework for controlling outputs generated by the NMT model may be advantageous to using alignment-based approaches, because the quality of the predicted alignments is poor, which leads to errors in the generated text. In contrast, the HBD framework provides a mechanism for the NMT model to, in a sense, "tell" the beam search when to start applying the constraints by inserting the alignment tokens as a part of decoding. In some embodiments, it can be said that the model may learn a rule that these tokens must appear in the output if they were observed in the input, but it also learns their most probable position, which would then be selected in the beam search. Thus, the model can "tell" that the constraints should be applied by assigning high probability to the special start tokens. In further embodiments, the model may be also conditioned on the "<HINT_START>" start token and to "know" which of the domain-specific translations needs to be produced.

In some embodiments, it is contemplated that using sparse references for the alignment tokens and making the alignment a part of the decoding may allow the model to obtain high precision alignments during translation and apply constraints only in the correct positions. It should be noted that this high precision alignment may not lead to low recall, as the NMT model "knows" that it needs to generate the alignment token and the translations without it becoming improbable.

It is contemplated that employing the HBD framework for controlling outputs generated by the NMT model may be advantageous to using input-based approaches. As stated above, trying to incorporate an additional input to a NMT model often results in the model ignoring this input. In the HBD framework, while providing an additional input for the model to condition on, the model relies on constraints to guarantee the use of correct translations.

In some embodiments, it can be said that the HBD framework does not increase the computational cost or lose translation quality when many terminology hints are applied as other approaches that utilize constrained beam search. In other embodiments, it can be said that using the HBD framework results in the NMT model knowing when and which hints are being translated, unlike both constrained beam search and alignment-based methods. In further embodiments, it can be said that using the HBD framework preserves strong constraint guarantees, unlike the approaches that utilize only an additional input. In additional embodiments, it can be said that the HBD framework may be implemented independently of the underlying NMT model architecture, which may be beneficial as the modern state-of-the-art architectures are changing frequently.

In a first broad aspect of the present technology, there is provided a method of performing domain-specific translation of sentences from a first language to a second language. The server is running a Neural Network (NN) and has access to a domain-specific vocabulary containing domain-specific translations of words from the first language into the second language. The method executable by the server. The method comprises generating, by the server, an augmented sequence of input tokens based on an input sentence in the first language and a hint inserted into the input sentence. The input sentence has a given word. The given word is represented in the augmented sequence of input tokens as a given input token. The given word has a domain-specific translation is represented as an other given token. The hint is represented in the augmented sequence of input tokens as an input start token and an input end token. The input start token is inserted at a position preceding the given input token and the input end token is inserted at a position following the given input token for identifying which input token in the augmented sequence of input tokens is the given input token. The method comprises iteratively generating, by the server using the NN, a sequence of output tokens based on the augmented sequence of input tokens. The method comprises, during the iteratively generating, in response to generating an output start token in the sequence of output tokens during a given iteration, applying a constraining condition on a then-next output token to be generated by the NN for the sequence of output tokens such that the then-next output token is the other given token. The method comprises, during the iteratively generating, in response to generating an output end token during an other given iteration, stopping the applying the constraining condition on a then-next token to be generated by the NN. The method comprises generating, by the server, a second sentence in the second language using the sequence of output tokens, the second sentence including the domain-specific translation of the given input word.

In some embodiments of the method, the given input token is a sub-sequence of input tokens, and the given input word is represented by the sub-sequence of input tokens in the augmented sequence of input tokens.

In some embodiments of the method, the other given token is an other sub-sequence of tokens, and the domain-specific translation of the given word is represented by the other sub-sequence of tokens.

In some embodiments of the method, the domain-specific vocabulary includes a plurality of the domain-specific translations of the given input word. The plurality of the domain-specific translations is represented by respective ones from a plurality of other sub-sequences of tokens. The applying the constraining condition includes applying the constraining condition on a then-next sub-sequence of output tokens to be generated by the NN for the sequence of output tokens such that the then-next sub-sequence of output tokens is one of the plurality of other sub-sequences of tokens.

In some embodiments of the method, the then-next sub-sequence of output tokens ends with the output end token.

In some embodiments of the method, the plurality of domain-specific translations of the given input word includes grammatical variants of the given input word.

In some embodiments of the method, the NN is a transformer model having an encoder and a decoder. The method further comprises, during a training phase, generating, by the server, an augmented sequence of first tokens based on a first sentence in the first language and a first hint inserted into the first sentence. The first sentence has a first word. The first word is represented in the augmented sequence of first tokens as a given first token. The first hint is represented in the augmented sequence of first tokens as a first start token and a first end token. The first start token is inserted at a position preceding the given first token and the first end token is inserted at a position following the given first token for identifying which first token in the augmented sequence of first tokens is the given first token. The method further comprises, during a training phase, generating, by the server, an augmented sequence of second tokens based on a second sentence in the second language and a second hint inserted into the second sentence. The second sentence is a translation of the first sentence. The second sentence has a second word. The second word is a domain-specific translation of the first word. The second word is represented in the augmented sequence of second tokens as a given second token. The second hint is represented in the augmented sequence of second tokens as a second start token and a second end token. The second start token is inserted at a position preceding the given second token and the second end token is inserted at a position following the given second token for identifying which second token in the augmented sequence of second tokens is the given second token. The method further comprises, during a training phase, training, by the server, the transformer model by providing the augmented sequence of first tokens to the encoder and the augmented sequence of second tokens to the decoder, so as to train the decoder to generate the output start token and the output end token at correct positions in the sequence of output tokens.

In some embodiments of the method, the hint is further represented in the augmented sequence of input tokens as a translation-hint special token and the other given token, the translation-hint special token and the other given token being inserted after the given input token and before the input end token.

In some embodiments of the method, the applying the constraining condition comprises: accessing, by the server, a whitelisted sub-sequence of tokens including the other given token and the special end token, and constraining, by the server the translation model, to generate the whitelisted sub-sequence of tokens as the then-next output token.

In a second broad aspect of the present technology, there is provided a method of training a transformer model for performing translation from a first language to a second language. The transformer model has an encoder and a decoder. The server is running the transformer model. The method comprises, during a training phase, generating, by the server, an augmented sequence of first tokens based on a first sentence in the first language and a first hint inserted into the first sentence. The first sentence has a first word. The first word is represented in the augmented sequence of first tokens as a given first token. The first hint is represented in the augmented sequence of first tokens as a first start token and a first end token. The first start token is inserted at a position preceding the given first token and the first end token is inserted at a position following the given first token for identifying which first token in the augmented sequence of first tokens is the given first token. The method comprises, during a training phase, generating, by the server, an augmented sequence of second tokens based on a second sentence in the second language and a second hint inserted into the second sentence. The second sentence is a translation of the first sentence. The second sentence has a second word. The second word is a domain-specific translation of the first word. The second word is represented in the augmented sequence of second tokens as a given second token. The second hint is represented in the augmented sequence of second tokens as a second start token and a second end token. The second start token is inserted at a position preceding the given second token and the second end token is inserted at a position following the given second token for identifying which second token in the augmented sequence of second tokens is the given second token. The method comprises, during a training phase, training, by the server, the transformer model by providing the augmented sequence of first tokens to the encoder and the augmented sequence of second tokens to the decoder, so as to train the decoder to generate an output start token and an output end token at correct positions in a sequence of output tokens.

In some embodiments of the method, the method further comprises, during an in-use phase of the NN iteratively generating, by the server using the NN, the augmented sequence of output tokens based on the augmented sequence of input tokens. During the iteratively generating, in response to generating the output start token in the sequence of output tokens during a given iteration, the method comprises applying a constraining condition on a then-next output token to be generated by the NN for the augmented sequence of output tokens such that the then-next output token is the other given token. During the iteratively generating, in response to generating the output end token during an other given iteration, the method comprises stopping the applying the constraining condition on a then-output next token to be generated by the NN. The method further comprises, during an in-use phase of the NN, generating, by the server, a second sentence in the second language using the augmented sequence of output tokens.

In a third broad aspect of the present technology, there is provided a server for performing domain-specific translation of sentences from a first language to a second language. The server is running a Neural Network (NN) and has access to a domain-specific vocabulary containing domain-specific translations of words from the first language into the second language. The server is configured to generate an augmented sequence of input tokens based on an input sentence in the first language and a hint inserted into the input sentence. The input sentence has a given word. The given word is represented in the augmented sequence of input tokens as a given input token. The given word has a domain-specific translation being represented as an other given token. The hint is represented in the augmented sequence of input tokens as an input start token and an input end token. The input start token is inserted at a position preceding the given input token and the input end token is inserted at a position following the given input token for identifying which input token in the augmented sequence of input tokens is the given input token. The server is configured to iteratively generate, using the NN, a sequence of output tokens based on the augmented sequence of input tokens. During the iteratively generating the server is configured to, in response to generating an output start token in the sequence of output tokens during a given iteration, apply a constraining condition on a then-next output token to be generated by the NN for the sequence of output tokens such that the then-next output token is the other given token. During the iteratively generating the server is configured to in response to generating an output end token during an other given iteration, stop the applying the constraining condition on a then-next token to be generated by the NN. The server is configured to generate a second sentence in the second language using the sequence of output tokens, the second sentence includes the domain-specific translation of the given input word.

In some embodiments of the server, the given input token is a sub-sequence of input tokens, the given input word is represented by the sub-sequence of input tokens in the augmented sequence of input tokens.

In some embodiments of the server, the other given token is an other sub-sequence of tokens, the domain-specific translation of the given word is represented by the other sub-sequence of tokens.

In some embodiments of the server, the domain-specific vocabulary includes a plurality of the domain-specific translations of the given input word. The plurality of the domain-specific translations is represented by respective ones from a plurality of other sub-sequences of tokens. To apply the constraining condition includes the server configured to apply the constraining condition on a then-next sub-sequence of output tokens to be generated by the NN for the sequence of output tokens such that the then-next sub-sequence of output tokens is one of the plurality of other sub-sequences of tokens.

In some embodiments of the server, the then-next sub-sequence of output tokens ends with the output end token.

In some embodiments of the server, the plurality of domain-specific translations of the given input word includes grammatical variants of the given input word.

In some embodiments of the server, the NN is a transformer model having an encoder and a decoder, the server further configured to, during a training phase generate an augmented sequence of first tokens based on a first sentence in the first language and a first hint inserted into the first sentence. The first sentence has a first word. The first word is represented in the augmented sequence of first tokens as a given first token. The first hint is represented in the augmented sequence of first tokens as a first start token and a first end token. The first start token is inserted at a position preceding the given first token and the first end token is inserted at a position following the given first token for identifying which first token in the augmented sequence of first tokens is the given first token. The server further configured to, during a training phase, generate an augmented sequence of second tokens based on a second sentence in the second language and a second hint inserted into the second sentence. The second sentence is a translation of the first sentence. The second sentence has a second word. The second word is a domain-specific translation of the first word. The second word is represented in the augmented sequence of second tokens as a given second token. The second hint is represented in the augmented sequence of second tokens as a second start token and a second end token. The second start token is inserted at a position preceding the given second token and the second end token is inserted at a position following the given second token for identifying which second token in the augmented sequence of second tokens is the given second token. The server further configured to, during a training phase, train the transformer model by providing the augmented sequence of first tokens to the encoder and the augmented sequence of second tokens to the decoder, so as to train the decoder to generate the output start token and the output end token at correct positions in the sequence of output tokens.

In some embodiments of the server, the hint is further represented in the augmented sequence of input tokens as a translation-hint special token and the other given token, the translation-hint special token and the other given token are inserted after the given input token and before the input end token.

In some embodiments of the server, to apply the constraining condition comprises the server configured to: access a whitelisted sub-sequence of tokens including the other given token and the special end token, and constrain the translation model to generate the whitelisted sub-sequence of tokens as the then-next output token.

In a fourth broad aspect of the present technology, there is provided a server for training a transformer model for performing translation from a first language to a second language. The transformer model has an encoder and a decoder. The server is running the transformer model. The server is configured to, during a training phase, generate an augmented sequence of first tokens based on a first sentence in the first language and a first hint inserted into the first sentence. The first sentence has a first word. The first word is represented in the augmented sequence of first tokens as a given first token. The first hint is represented in the augmented sequence of first tokens as a first start token and a first end token. The first start token is inserted at a position preceding the given first token and the first end token is inserted at a position following the given first token for identifying which first token in the augmented sequence of first tokens is the given first token. The server is configured to, during a training phase, generate an augmented sequence of second tokens based on a second sentence in the second language and a second hint inserted into the second sentence. The second sentence is a translation of the first sentence. The second sentence has a second word. The second word is a domain-specific translation of the first word. The second word is represented in the augmented sequence of second tokens as a given second token. The second hint is represented in the augmented sequence of second tokens as a second start token and a second end token. The second start token is inserted at a position preceding the given second token and the second end token is inserted at a position following the given second token for identifying which second token in the augmented sequence of second tokens is the given second token. The server is configured to, during a training phase, train the transformer model by providing the augmented sequence of first tokens to the encoder and the augmented sequence of second tokens to the decoder, so as to train the decoder to generate an output start token and an output end token at correct positions in a sequence of output tokens.

In some embodiments of the server, the server is further configured to, during an in-use phase of the NN, iteratively generate, by the server using the NN, the augmented sequence of output tokens based on the augmented sequence of input tokens. During the iteratively generating the server is configured to, in response to generating the output start token in the sequence of output tokens during a given iteration, apply a constraining condition on a then-next output token to be generated by the NN for the augmented sequence of output tokens such that the then-next output token is the other given token. During the iteratively generating the server is configured to, in response to generating the output end token during an other given iteration, stop the applying the constraining condition on a then-output next token to be generated by the NN. The server is further configured to, during an in-use phase of the NN, generate a second sentence in the second language using the augmented sequence of output tokens.

In the context of the present specific, a "transformer" model is a model having an encoder-decoder architecture that employs attention mechanisms. Attention mechanisms may be employed during processing of data by the encoder, during processing of data by the decoder, and during encoder-decoder interactions. A variety of attention mechanisms may be employed as part of a transformer model.

Self-attention may be one of the components of the transformer model. The difference between attention mechanism and self-attention mechanism is that self-attention operates between representations of the same nature: e.g., all encoder states in some layer. Self-attention mechanism is a part of the transformer model where tokens interact with each other. Each token in a sense "looks" at other tokens in the sentence with an attention mechanism, gathers context, and updates the previous representation of "self". Each input token in a self-attention mechanism receives three representations: (i) query, (ii) key, and (ii) value. The query is used when a token looks at others—it's seeking the information to understand itself better. The key is responding to a query's request: it is used to compute attention weights. The value is used to compute attention output: it gives information to the tokens which "say" they need it (i.e. assigned large weights to this token).

Masked self-attention may be an other one of the components of the transformer model. The decoder usually includes this particular self-attention mechanism and which is different from the self-attention mechanism in the encoder. While the encoder receives all tokens at once and the tokens can look at all tokens in the input sentence, in the decoder, tokens are generated one at a time—during generation, the model does not know which tokens will be generated in future. To forbid the decoder to "look ahead", the transformer model uses masked self-attention—i.e., future tokens are masked out.

Multi-head attention is a further one of the components of the transformer model. It should be noted that understanding the role of a word in a sentence requires understanding how it is related to different parts of the sentence. This is important not only in processing source sentence but also in generating targets. As a result, this type of attention mechanism may allow the transformer model to "focus of different things". Instead of having one attention mechanism, multi-head attention has several "heads" which work independently. This may be implemented as several attention mechanisms whose results are combined.

The encoder of the transformer model can include an encoder self-attention mechanism and a feedforward network block. The encoder self-attention mechanism may be a multi-head attention mechanism used for tokens to "look" at each other. The queries, keys, values are computed from encoder states. The feedforward network block receives the information from tokens and processes that information.

The decoder of the transformer model can include a decoder self-attention mechanism (masked), a decoder-encoder attention mechanism, and a feedforward network. The decoder masked self-attention mechanism may be a masked multi-head attention mechanism used for tokens to "look" at previous tokens. The queries, keys, values are computed from decoder states. The decoder-encoder attention mechanism may be a multi-head attention mechanism used for target tokens to "look" at the source information. Queries are computed from decoder states, while keys and values are computed from encoder states. The feedforward network block receives the information from tokens and processes that information.

It can be said that in the encoder, tokens communicate with each other and update their representations. It can also be said that in the decoder, a target token first looks at previously generated target tokens, then at the source, and finally updates its representation. This can be repeated in several layers. In one non-limiting implementation, this can be repeated 6 times.

As mentioned above, in addition to an attention mechanism, a given layer has a feedforward network block. For example, the feedforward network block may be represented by two linear layers with a ReLU non-linearity between them. After looking at other tokens via an attention mechanism, a model uses a feedforward network block to process this new information. The transformer model may further comprise residual connections for adding a block's input to its output. Residual connections may be used for stacking layers. In a transformer model, residual connections can be used after a respective attention mechanism and feedforward network block. For example, an "Add & Norm" layer may be provided with (i) the input of an attention mechanism via a residual connection and (ii) the output of the attention mechanism. The result of this Add & Norm layer may then be provided to a feedforward network block or another attention mechanism. In another example, an "Add & Norm" layer may be provided with (i) the input of an feedforward network block via a residual connection and (ii) the output of the feedforward network block. As alluded to above, the transformer model may comprise Add & Norm layers. Broadly speaking, such a layer can independently normalize vector representation of each example in a batch—this is done to control "flow" to the next layer. Layer normalization may improve convergence stability and sometimes even quality.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
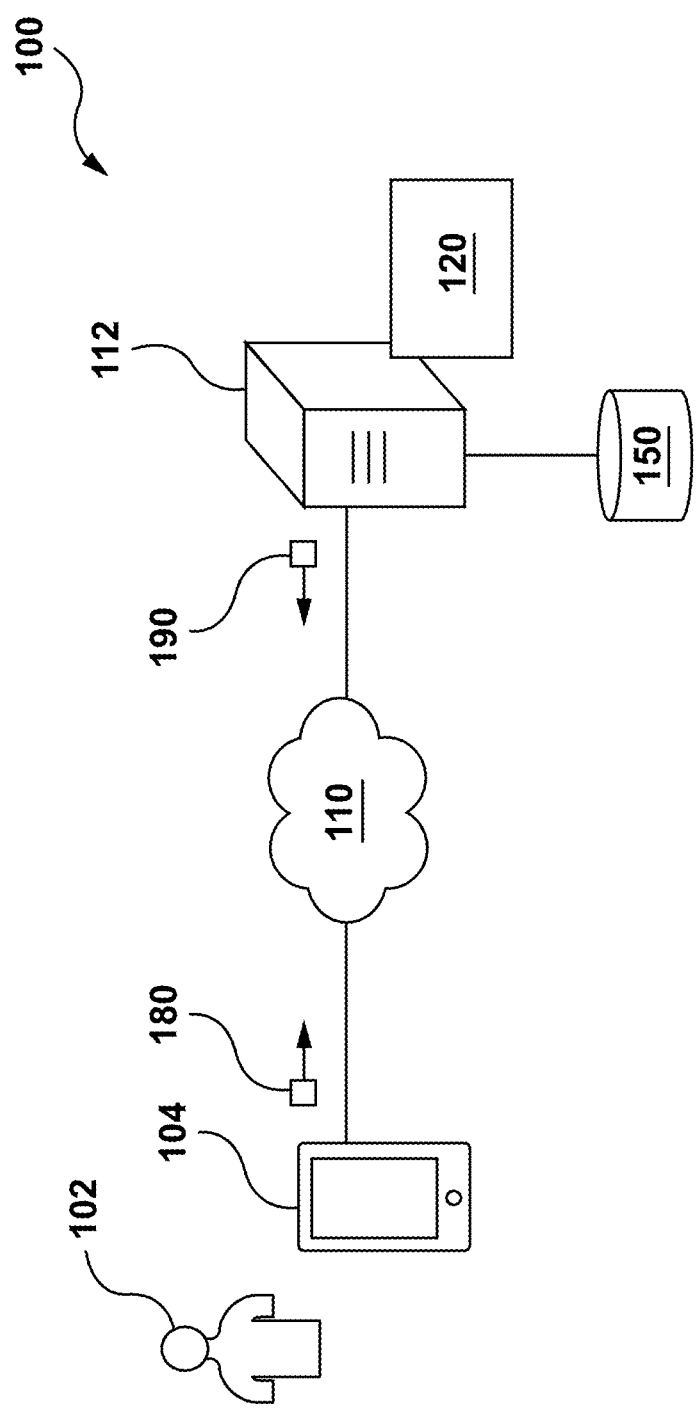
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic translation services for a user 102 of an electronic device 104. For example, the system 100 may be configured to acquire a sentence in a source language, and provide a translated version of that sentence in a target language. At least some components of the system 100 will now be described, however, it should be understood that other components to those depicted in FIG. 1 may be part of the system 100 without departing from the scope of the present technology.

Communication Network

The electronic device 104 is communicatively coupled to a communication network 110 for communication with the server 112. For example, the electronic device 104 may be communicatively coupled with the server 112 via the communication network 110 for providing the user 102 with the translation services. The communication network 110 is configured to transmit inter alia requests and responses between the electronic device 104 and the server 112 in a form of one or more data packets comprising communication data.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the electronic device 104 and the communication network 110 is implemented will depend inter alia on how the electronic device 104 is implemented.

Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a browser application.

Generally speaking, the purpose of the browser application is to enable the user 102 to access one or more network resources, such as web pages, for example. How the browser application is implemented is not particularly limited. One example of the browser application may be embodied as a Yandex™ browser.

The user 102 may use the browser application for accessing a translation engine for translating one or more sentences from a source language to a target language. For example, the electronic device 104 may be configured to generate a request indicative of one or more sentences that the user 102 desires to be translated. Also, the electronic device 104 may be configured to receive a response (not depicted) for displaying a translated version of one or more sentences in the target language to the user 102. Typically, the request and the response may be transmitted from and to the electronic device 104 via the communication network 110.

Database

The system 100 also comprises a database 150 which is communicatively coupled to the server 112 and is configured to store information extracted or otherwise determined or generated by the server 112. Generally speaking, the database 150 may receive data from the server 112 which was extracted or otherwise determined or generated by the server 112 during processing for temporary and/or permanent storage thereof and may provide stored data to the server 112 for use thereof. It is contemplated that the database 150 may be split into several distributed databases without departing from the scope of the present technology.

Figure 3:
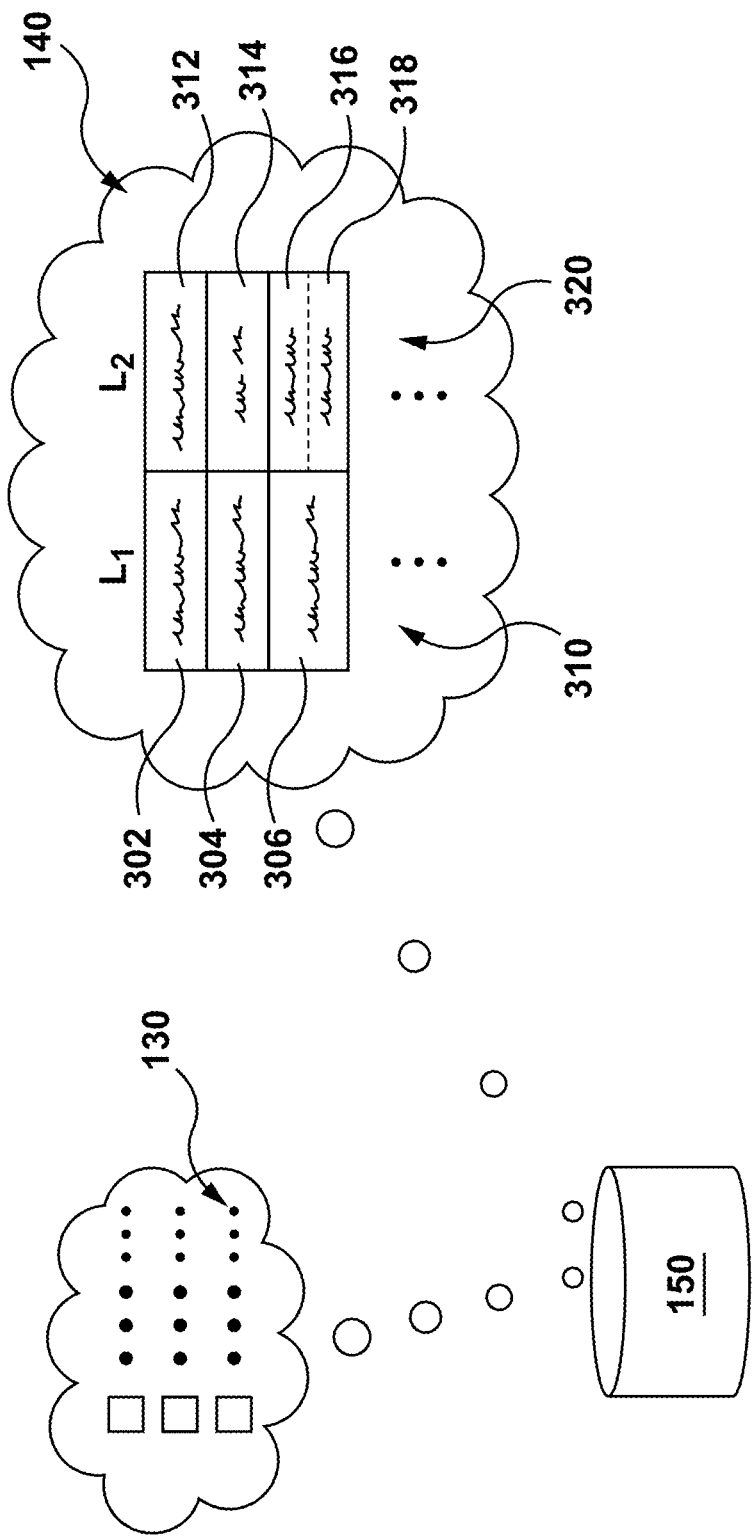
FIG. 3 depicts a representation of data stored in a database of the system of FIG. 1, in accordance with some non-limiting embodiments of the present technology.

The database 150 may be configured to store data for supporting translation services providable by the translation engine of the server 112. To that end, the database 150 may store inter alia a domain-specific vocabulary 140 and a plurality of training examples 130 as depicted in FIG. 3.

Broadly speaking, the domain-specific vocabulary 140 is a data structure comprising a large number of words 310 in a first language (i.e., source language) and their corresponding domain-specific translations 320 in a second language (i.e., destination/target language). The data structure is accessible by the server 112 for retrieving information therefrom.

In one non-limiting embodiment, the domain-specific vocabulary 140 may be generated by an operator of the server 112 based on third-party requests. In one example, based on third-party requests, the operator may include in the domain-specific vocabulary 140 the word "Microsoft" in English and their domain-specific translation "Майкрософт" in Russian.

In the illustrated non-limiting example, the words 310 in the first language include a first word 302, a second word 304 and a third word 306. The domain-specific vocabulary 140 includes a domain-specific translation 312 of the first word 302. The domain-specific translation 312 is a single word. Also, the domain-specific vocabulary 140 includes a domain-specific translation 314 of the second word 304. The domain-specific translation 312 is composed of two words. The domain specific vocabulary 140 includes a plurality of domain-specific translations (not numbered) including a first domain-specific translation 316 and a second domain-specific translation 318 of the third word 306. It is contemplated that the first domain-specific translation 316 and the second domain-specific translation 318 may represent respective grammatical variants, or "forms", of the domain-specific translation of the third word 306.

In some embodiments of the present technology, it is contemplated that a given domain-specific vocabulary may comprise domain-specific translations in more than one second languages without departing from the scope of the present technology. It can be said that the data structure may be bi-lingual, tri-lingual, and so forth.

Additionally, or alternatively, the database 150 may store a plurality of domain-specific vocabularies, similar to the domain-specific vocabulary 140, each of which is associated with a respective domain. For example, the domain-specific vocabulary 140 may be directed to translations of words used in a medical domain, while other domain-specific vocabularies may be directed to translations of words in the aerospace domain, legal domain, commercial domain, sports domain, and the like, respectively.

It should be noted that translations of a given word may be different depending on a specific domain with which the sentence or word is to be translated. As a result, providing domain-specific translations as opposed to any translation of a given word may increase the translation quality of the translation engine. As it will be described in greater details herein further below, the domain-specific vocabulary 140 may be employed by the electronic device 104 during training, and in-use phases of at least some Machine Learning Algorithms (MLAs) included in the translation engine of the server 112.

As mentioned above, the database 150 may further comprise the plurality of training examples 130 for training one or more MLAs included in the translation engine of the server 112. The plurality of training examples 130 may include a large number of parallel sentences, where each pair of parallel sentences includes a first one in the first language and a second one in the second language. It is also contemplated that a respective plurality of training examples may be stored for respective source-target pair of languages, without departing from the scope of the present technology. How the plurality of training examples 130 may be employed by the server 112 during training of one or more MLAs will be described in greater detail herein further below.

Server

The system 100 also comprises the server 112 that can be implemented as a conventional computer server. In the depicted non-limiting embodiments of the present technology, the server 112 is a single server. In alternative non-limiting embodiments of the present technology, functionalities of the server 112 may be distributed and may be implemented via multiple servers. The server 112 may include one or more processors, one or more non-transitory memory devices, computer-readable instructions, and/or additional hardware components, additional software components, and/or combination thereof, for implementing various functionalities of the server 112, without departing from the scope of the present technology.

Generally speaking, the server 112 can be under control and/or management of a translation service provider (not depicted), such as, for example, an operator of Yandex™ translation services. It is contemplated that the provider of the translation services and the provider of the browser application may be the same provider. For example, the browser application (e.g., Yandex™ browser) and the translation services (e.g., Yandex™ translation services) may be provided, controlled and/or managed by the same operator or entity.

As mentioned above, the server 112 hosts a translation engine (not depicted). Broadly speaking, the translation engine is embodied as a plurality of computer-implemented procedures that are used for translating one or more sentences from a source language into a target language and providing the translations to users of the translation engine. To that end, the server 112 is configured to execute a translation model 120.

Machine Learning Algorithms

Generally speaking, MLAs can learn from training samples and make predictions on new (unseen) data. The MLAs are usually used to first build a model based on training inputs of data in order to then make data-driven predictions or decisions expressed as outputs, rather than following static computer-readable instructions.

The MLAs are commonly used as estimation models, translation models, classification models and the like. It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

Furthermore, the implementation of a given MLA can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

It is contemplated that the translation model 120 may be a Neural Machine Translation (NMT) model having a transformer architecture. Broadly speaking, a transformer model or simply "transformer" is a deep learning model that adopts the mechanism of attention and may differentially weigh the significance of each part of the input data.

Similar to some other models, the transformer adopts an encoder-decoder architecture. The encoder consists of encoding layers that process the input iteratively one layer after another, while the decoder consists of decoding layers the encoder's output iteratively one layer after another. The function of each encoder layer is to generate encodings that contain information about which parts of the inputs are relevant to each other. It passes its encodings to the next encoder layer as inputs. Each decoder layer can be said to do the "opposite", taking all the encodings and using their incorporated contextual information to generate an output sequence. To achieve this, encoder and decoder layers make use of an attention mechanism.

Generally, for a given input, the attention mechanism weighs the relevance of other inputs and draws from them to produce the output. Also, each decoder layer may have an additional attention mechanism that draws information from the outputs of previous decoders, before the decoder layer draws information from the encodings. It is contemplated that both the encoder and decoder layers may have a feed-forward NN for additional processing of the outputs, and contain residual connections and layer normalization steps.

Figure 2:
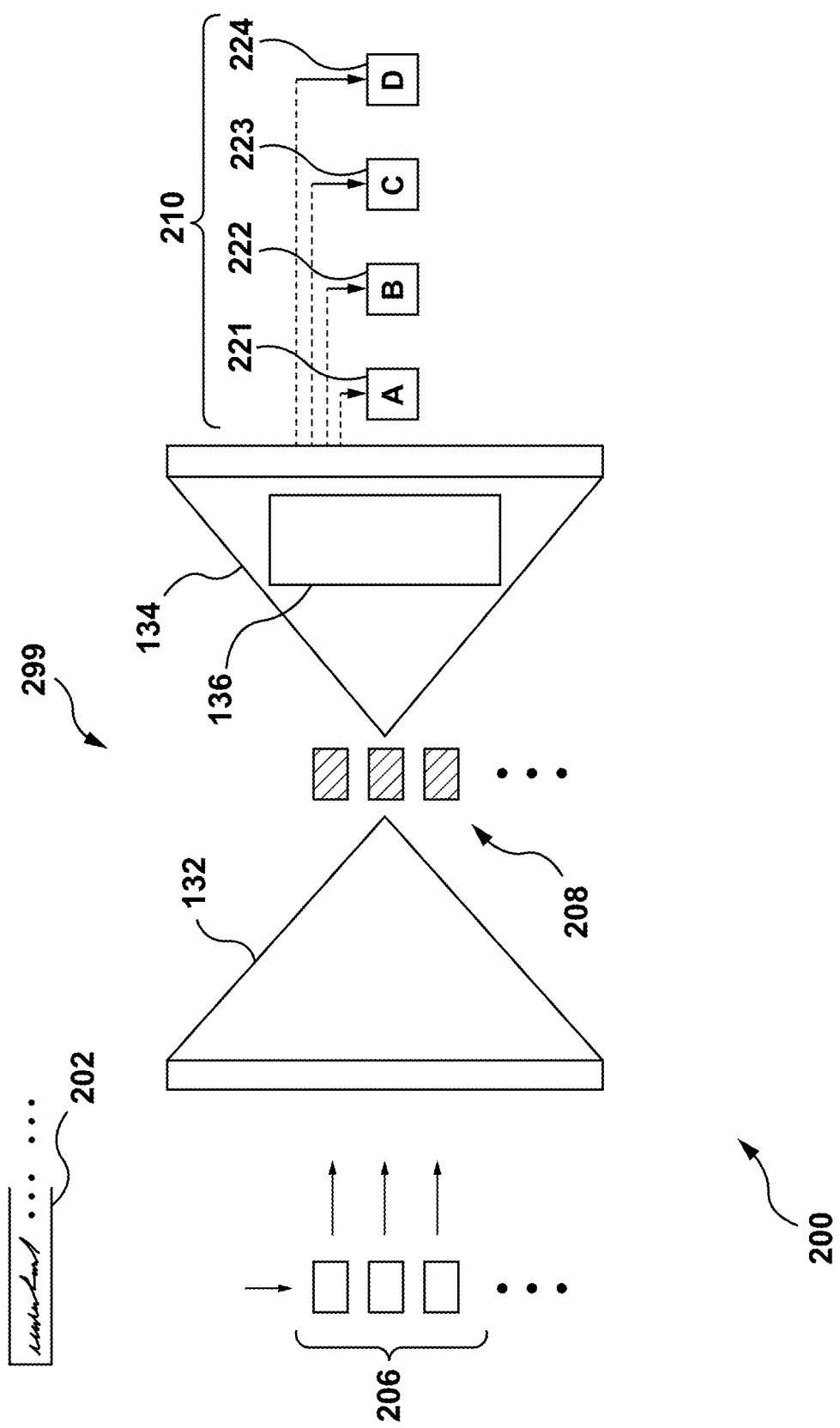
FIG. 2 depicts a representation of a conventional translation model for generating a sequence of output tokens.

With reference to FIG. 2, there is depicted an encoder portion 132 (or simply "encoder") and a decoder portion 134 (or simply "decoder") of a conventional transformer model 299. Broadly speaking, the encoder 132 receives a sequence of input tokens generated based on text in the source language and produces a compact representation of that input sequence, trying to summarize or condense all of its information. These compact representations are received by the decoder portion 134, and which can also receive other external inputs. At each step, the decoder portion 134 generates an element of its output sequence (an output token) based on the inputs received, and can update its own state for the next step where an other element of the output sequence is generated (a next output token).

The decoder portion 134 can be implemented with an attention mechanism 136. The attention mechanism 136 can be implemented via an attention layer that allows the decoder portion 134 to, in a sense, "attend" to particular information during output generation as it will be described herein further below.

In some cases, the decoder portion 134 may be a "greedy" decoder. For example, the decoder portion 134 may be configured to generate a given output sequence representative of a word in a target language and which has the highest probability of being a translation of respective word in a source language. It is contemplated that a beam search algorithm may be used during the decoding process.

The source sentence 202 may be split into a sequence of input tokens 206. The input tokens may be provided to the encoder portion 132. The encoder portion 132 is configured to generate hidden vector representations based on the inputted tokens. For example, the electronic device 104 employing the encoder portion 132 may be configured to generate a vector representations 208 for the sequence of input tokens 206.

Vector representations may be provided to the decoder portion 134. The decoder portion 134 is configured to generate output tokens based on inter alia vector representations generated by the encoder portion 132 and other inputs, such as previously generated output tokens, for example. Output tokens generated by the decoder portion 134 may be used for providing a translation of the source sentence 202 (i.e., a target sentence) to the user 102.

The decoder portion 134 is configured to use the sequence of vector representations 208 for generating a first output token 221. At the next step, the decoder portion 134 is configured to further use the first output token 221 (additional input) for generating a second output token 222. At the next step, the decoder portion 134 is configured to further use the second output token 222 (additional input) for generating a third output token 223. At the next step, the decoder portion 134 is configured to further use the third output token 223 (additional input) for generating a fourth output token 224, and so forth.

As previously alluded to, the electronic device 104 may make use of the attention mechanism 136 for taking into account previous output tokens generated by the decoder portion 134 for generating a current output token in a sequence of output tokens. In some embodiments, the decoder portion 134 may be configured to use one or more output tokens generated by the decoder portion 134 and which are associated with the current and/or previous words generated by the decoder portion 134.

The decoder portion 134 generates a sequence of output tokens 210 based on inter alia the vector representations 208 as well as previous output tokens in the sequence of output tokens 210 for generating a current output token from the sequence of output tokens 210.

Developers of the present technology have realized that the conventional translation model 299 suffers from poor translation quality of specific domains of input sentences and/or the inability to translate some rare words correctly. Further, it should be noted that re-training the NMT model for each domain is computationally expensive, and only a small amount of domain-specific data may be available for such training.

In some embodiments of the present technology, developers have devised a framework for inserting hints into input sentences for providing control over output sentences generated by an NMT model. How training examples can be generated from training such an NMT model will now be described.

Figure 4:
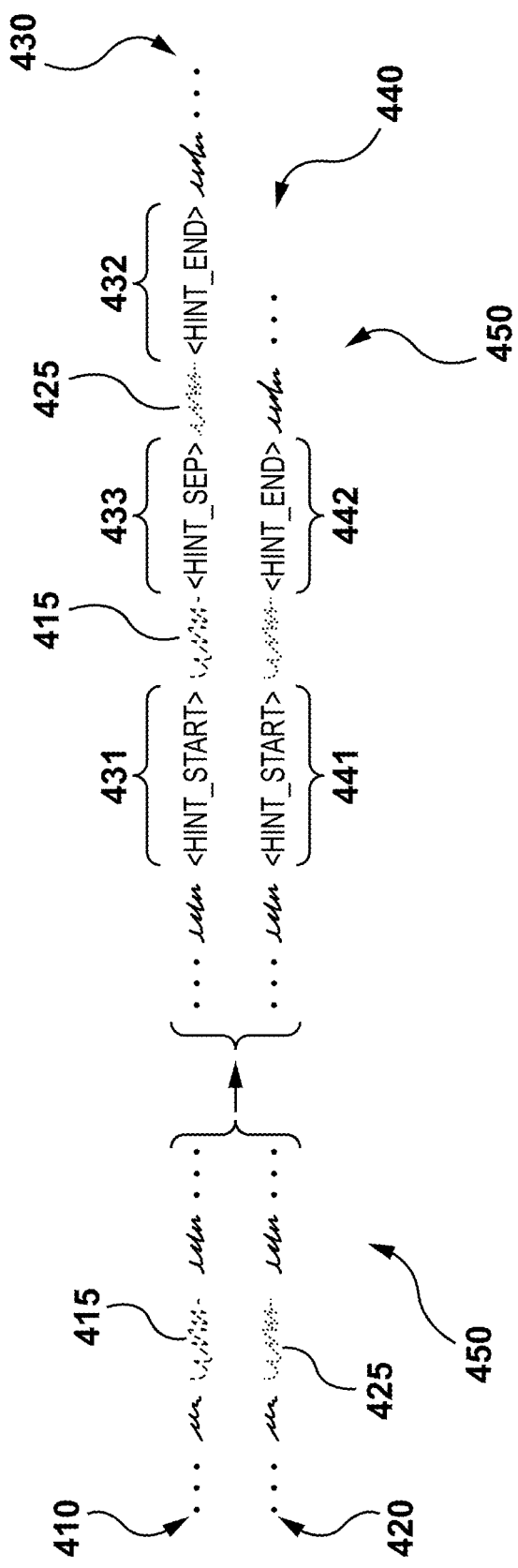
FIG. 4 depicts a representation of an augmented training example being generated by a server of the system of FIG. 1, in accordance with some non-limiting embodiments of the present technology.

With reference to FIG. 4, there is depicted a pair of parallel sentences 400 that the server 112 may access from the database 150. The pair of parallel sentences 400 includes a first sentence 410 in a first language and a second (parallel) sentence 420 in a second language.

The server 112 may be configured to perform word alignment on the pair of parallel sentences 400. In some embodiments, the server 112 may make use of the domain-specific vocabulary 140 for identifying a word 415 in the first sentence 410 and a (aligned) word 425 in the second sentence 420. It can be said that the word 425 is a domain-specific translation of the word 415 identified based on the information accessible from the domain-specific vocabulary 410.

In the context of the present technology, the server 112 is configured to augment the first sentence 410 and the second sentence 420 with "hints". In other words, the server 112 may be configured to generate a pair of augmented sentences 450 by inserting hints in the pair of parallel sentence 400.

The server 112 inserts a hint in the first sentence 410 in a form of a textual input 431 "<HINT_START>" and a textual input 432 "<HINT_END>". The textual input 431 is inserted in the first sentence 410 at a position preceding the position of the word 415 and the textual input 432 is inserted in the first sentence 410 at a position following the position of the word 415. In some embodiments, it is contemplated that the server 112 may insert the textual input 431 at an immediately preceding position to the position of the word 415 and the textual input 432 at an immediately following position to the position of the word 415, thereby "wrapping" the word 415 with the textual input 431 and the textual input 432 in a first augmented sentence 430. As it will become apparent from the description herein further below, insertion of the textual input 431 and of the textual input 432 into the first sentence 410 may be performed for providing the translation model 120 with positional information about the word 415 in the first augmented sentence 430 (and in the corresponding augmented sequence of tokens).

In the illustrated non-limiting embodiment, the hint inserted by the server 112 is further formed of a textual input 433 "<HINT_SEP>" and the word 425. The server 112 inserts the textual input 433 and the word 425 at a position between the word 415 and the textual input 432. Insertion of the textual input 433 and the word 425 may be performed for providing the translation model 130 with additional information about the domain-specific translation of the word 415 (i.e., the word 425).

The server 112 inserts a hint in the second sentence 420 in a form of a textual input 441 "<HINT_START>" and a textual input 442 "<HINT_END>". The textual input 441 is inserted in the second sentence 420 at a position preceding the position of the word 425 and the textual input 442 is inserted in the second sentence 420 at a position following the position of the word 425. In some embodiments, it is contemplated that the server 112 may insert the textual input 441 at an immediately preceding position to the position of the word 425 and the textual input 442 at an immediately following position to the position of the word 425, thereby "wrapping" the word 415 with the textual input 441 and the textual input 442 in a first augmented sentence 440. As it will become apparent from the description herein further below, insertion of the textual input 441 and of the textual input 442 into the second sentence 420 may be performed for providing the translation model 120 with positional information about the word 425 in the second augmented sentence 440 (and in the corresponding augmented sequence of tokens).

In some embodiments of the present technology, it can be said that the server 112 may be configured to use a training example including a pair of parallel sentences for generating an augmented training example including a pair of parallel augmented sentences. The augmentation process of the training example includes insertions of corresponding hints into a first sentence and into a second sentence of the training example. A first hint is inserted in a form of at least two textual inputs that "wrap" a given word in the first sentence. A second, corresponding hint, is inserted in a form of at least two textual inputs that "wrap" a corresponding word (domain-specific translation) in the second sentence. In additional embodiments, the first hint may further include an other textual input that represents information about the domain-specific translation in the first sentence.

Figure 5:
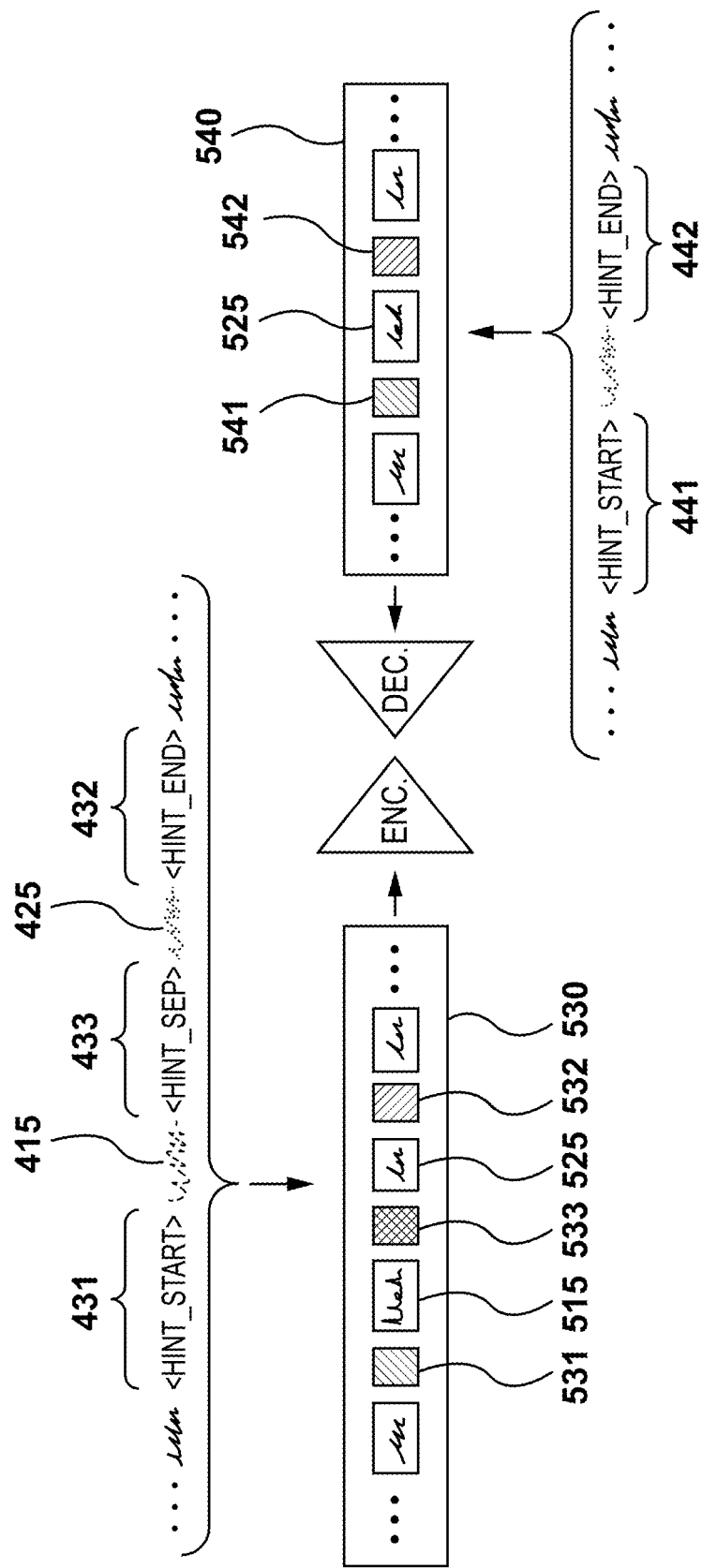
FIG. 5 depicts a training iteration a translation model of the system of FIG. 1, in accordance with some non-limiting embodiments of the present technology.

In the context of the present technology, the server 112 is configured to train the translation model 120 on the pair of augmented sentences 450, instead of the pair of sentences 400. With reference to FIG. 5, there is depicted a representation of how the server 112 may use the pair of augmented sentences 450 for training the translation model 120. The server 112 is configured to provide the first augmented sentence 430 to the encoder portion of the translation model 120, while providing the second augmented sentence 440 to the decoder portion of the translation model 120.

It should be noted that the translation model 120 may perform tokenization of the first augmented sentence 430. Broadly speaking, tokenization is a process of breaking down a piece of text, such as a sentence, into smaller units called "tokens". A token may be a word, part of a word and/or just a character, like punctuation, for example. As a result, the server 112 may be configured to generate a first augmented sequence of tokens 530 based on the first augmented sentence 430 and a second augmented sequence of tokens 540 based on the second augmented sentence 440.

The first augmented sequence of tokens 530 comprises a subsequence of tokens including tokens 531, 515, 533, 525, and 532. The token 531 is a special start token that represents the textual input 431. The token 515 represents the word 415. The token 533 is a translation-hint special token and represents the textual input 433. The token 525 represents the word 425 (domain-specific translation of the word 415). The token 532 is a special end token that represents the textual input 432.

It is contemplated that in some embodiments, the tokens 533 and 525 may be omitted from the first augmented sequence of tokens 530, without departing from the scope of the present technology. In other embodiments, the first augmented sequence of tokens 530 may comprise, in addition to tokens representative of words from the first sentence 410, special tokens representative of the inserted hint—that is, at least a special start token and a special end token at positions that "wrap" the token 515.

The second augmented sequence of tokens 540 comprises a subsequence of tokens including tokens 541, 525, and 542. The token 541 is a special start token that represents the textual input 441. The token 525 represents the word 425. The token 542 is a special end token that represents the textual input 442.

In some embodiments, the second augmented sequence of tokens 540 may comprise, in addition to tokens representative of words from the second sentence 420, special tokens representative of the inserted hint—that is, at least a special start token and a special end token at positions that "wrap" the token 525.

It is contemplated that the first augmented sequence of tokens 530 and the second augmented sequence of tokens 540 can be said to be "augmented" if compared to sequences of tokens the server 112 would have generated based on the first sentence 410 and the second sentence 420, respectively. In other words, it can be said that the first augmented sequence of tokens 530 and the second augmented sequence of tokens 540 are "augmented" due to the presence of special tokens in the first augmented sequence of tokens 530 and the second augmented sequence of tokens 540.

During a given training iteration, the first augmented sequence of tokens 530 may be processed by the encoder portion of the translation model 120 and the second augmented sequence of tokens 540 may be processed by the decoder portion of the translation model 120.

During the training of the translation 120, the translation model 120 is inputted with a large number of augmented training examples having been generated similarly to what has been described with reference to FIG. 4. It can be said that the translation model 120 learns where to generate an output special start token in a sequence of output tokens.

Developers of the present technology have realized that the positional information provided by the output special start token can be leveraged during inference. As it will be described in greater detail herein further below, once the output special start token is generated by the translation model 120 during in-use, the server 112 may apply a constraint (e.g., during inference) such that the then-next token(s) generated by the translation model are representative of the domain-specific translation followed by an output special end token.

Developers of the present technology have realized that the positional information provided by the output special end token can be leveraged during inference. As it will be described in greater detail herein further below, once the output special start token is generated by the translation model 120 during in-use, the server 112 is configured to remove the constraint so that the then-next token is generated in an unconstrained manner.

In some embodiments of the present technology, it can be said that the translation model 120 may be trained, not only to generate a special start token, but may also be trained to generate a special end token based on the input tokens. In further embodiments, it can also be said that the translation model may also be trained to take into account the translation-hint word that can be inserted into the input sentence when performing translation.

Figure 6:
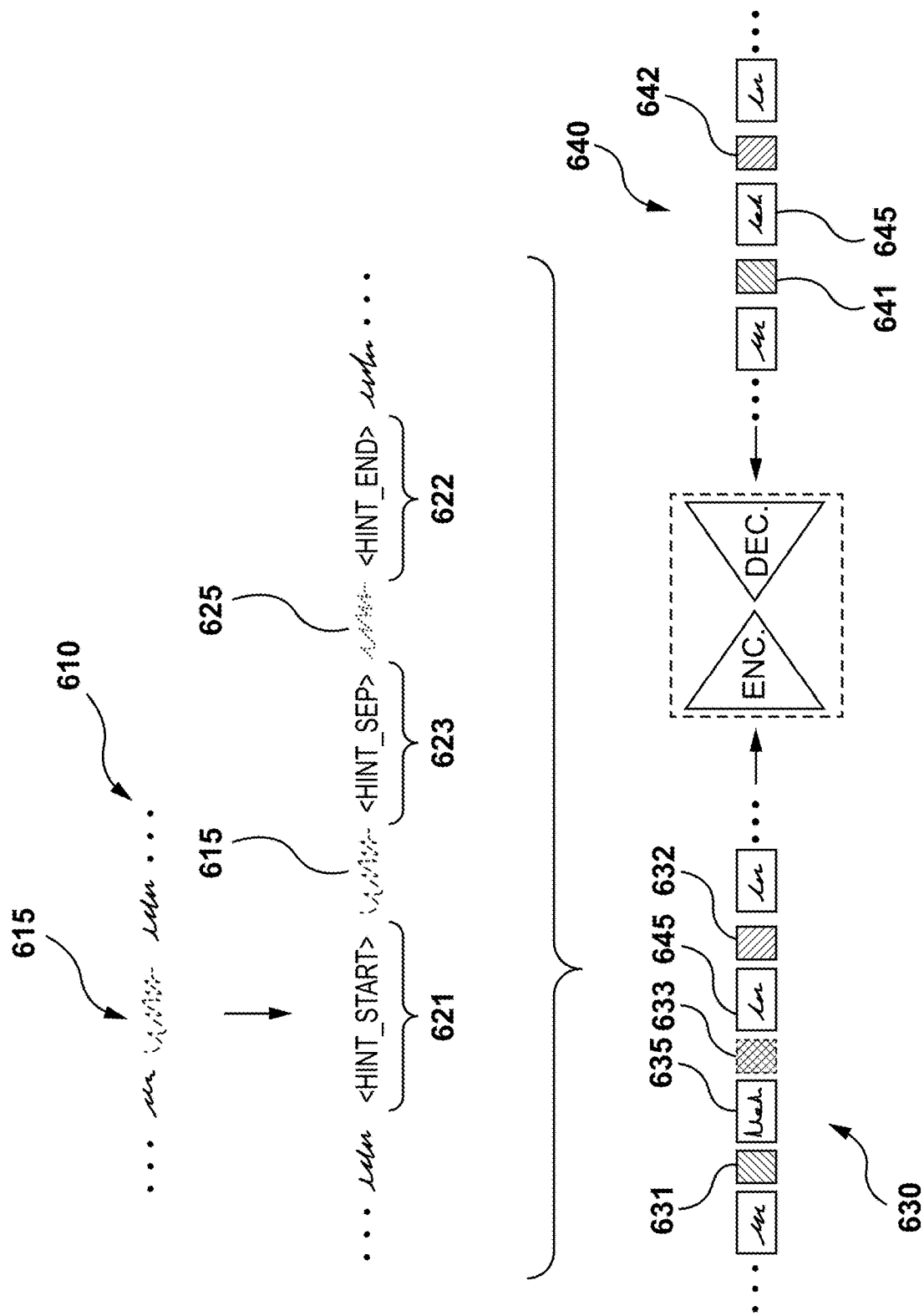
FIG. 6 depicts an in-use iteration of the translation model of FIG. 5, in accordance with some non-limiting embodiments of the present technology.

With reference to FIG. 6, there is depicted an in-use iteration of the translation model 120. During the in-use iteration, the server 112 is configured to acquire an input sentence 610 in the first language for translation. The server 112 may be configured to compare words from the input sentence 610 and determine if at least one of the words in the input sentence 610 correspond to a word in the domain-specific vocabulary 140. In response, the server 112 may be configured to determine a presence of a word 615 in the input sentence. It is contemplated that the server 112 may be configured to determine one or more domain-specific translations of the word 615 in the domain-specific vocabulary 140.

The server 112 is configured to augmented the input sentence 610 with a "hint". The server 112 inserts a hint in the input sentence 610 in a form of a textual input 621 "<HINT_START>" and a textual input 622 "<HIN-T_END>". The textual input 621 is inserted in the input sentence 610 at a position preceding the position of the word 615 and the textual input 622 is inserted in the input sentence 610 at a position following the position of the word 615. In some embodiments, it is contemplated that the server 112 may insert the textual input 621 at an immediately preceding position to the position of the word 615 and the textual input 622 at an immediately following position to the position of the word 615, thereby "wrapping" the word 615 with the textual input 621 and the textual input 632 in an augmented input sentence 620. Insertion of the textual input 621 and of the textual input 622 into the input sentence 610 may be performed for providing the translation model 120 with positional information about the word 615 in the augmented input sentence 620 (and in the corresponding augmented sequence of tokens).

In the illustrated non-limiting embodiment, the hint inserted by the server 112 is further formed of a textual input 623 "<HINT_SEP>" and the word 625. The server 112 inserts the textual input 623 and the word 625 at a position between the word 615 and the textual input 622. Insertion of the textual input 623 and the word 625 may be performed for providing the translation model 120 with additional information about the domain-specific translation of the word 615 (i.e., the word 625).

The server 112 is configured to perform tokenization on the augmented input sentence 620, thereby generating an augmented sequence of input tokens 630. The augmented sequence of input tokens 630 comprises a subsequence of tokens including tokens 631, 635, 633, 645, and 632. The token 631 is a special start token that represents the textual input 621. The token 635 represents the word 615. The token 633 is a translation-hint special token and represents the textual input 623. The token 455 represents the word 625 (domain-specific translation of the word 615). The token 632 is a special end token that represents the textual input 622.

It is contemplated that in some embodiments, the tokens 633 and 645 may be omitted from the first augmented sequence of tokens 630, without departing from the scope of the present technology. In other embodiments, the augmented sequence of input tokens 630 may comprise, in addition to tokens representative of words from the first sentence 610, special tokens representative of the inserted hint—that is, at least a special start token and a special end token at positions that "wrap" the token 635.

The server 112 is configured to use the translation model 120 for iteratively generating a sequence of output tokens 640 based on the augmented sequence of input tokens 630. The sequence of output tokens 640 includes inter alia an output start token 641, an output token 625, and an output end token 642. The translation model 130 generates output tokens in the sequence of output tokens 640 in an iterative manner.

Figure 7:
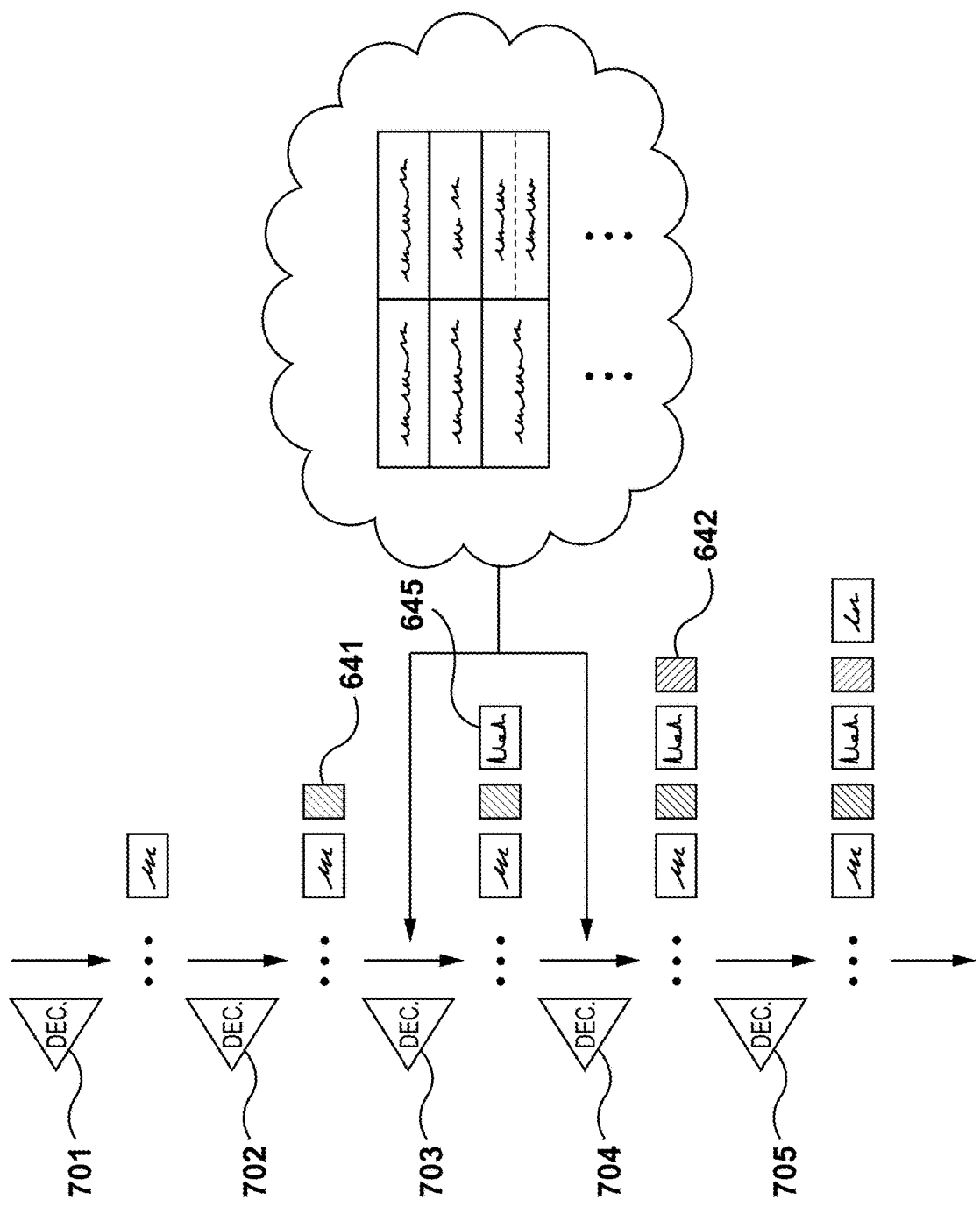
FIG. 7 depicts decoding performed by the translation model of FIG. 5 during the in-use itineration of FIG. 6, in accordance with some non-limiting embodiments of the present technology.
Figure 8:
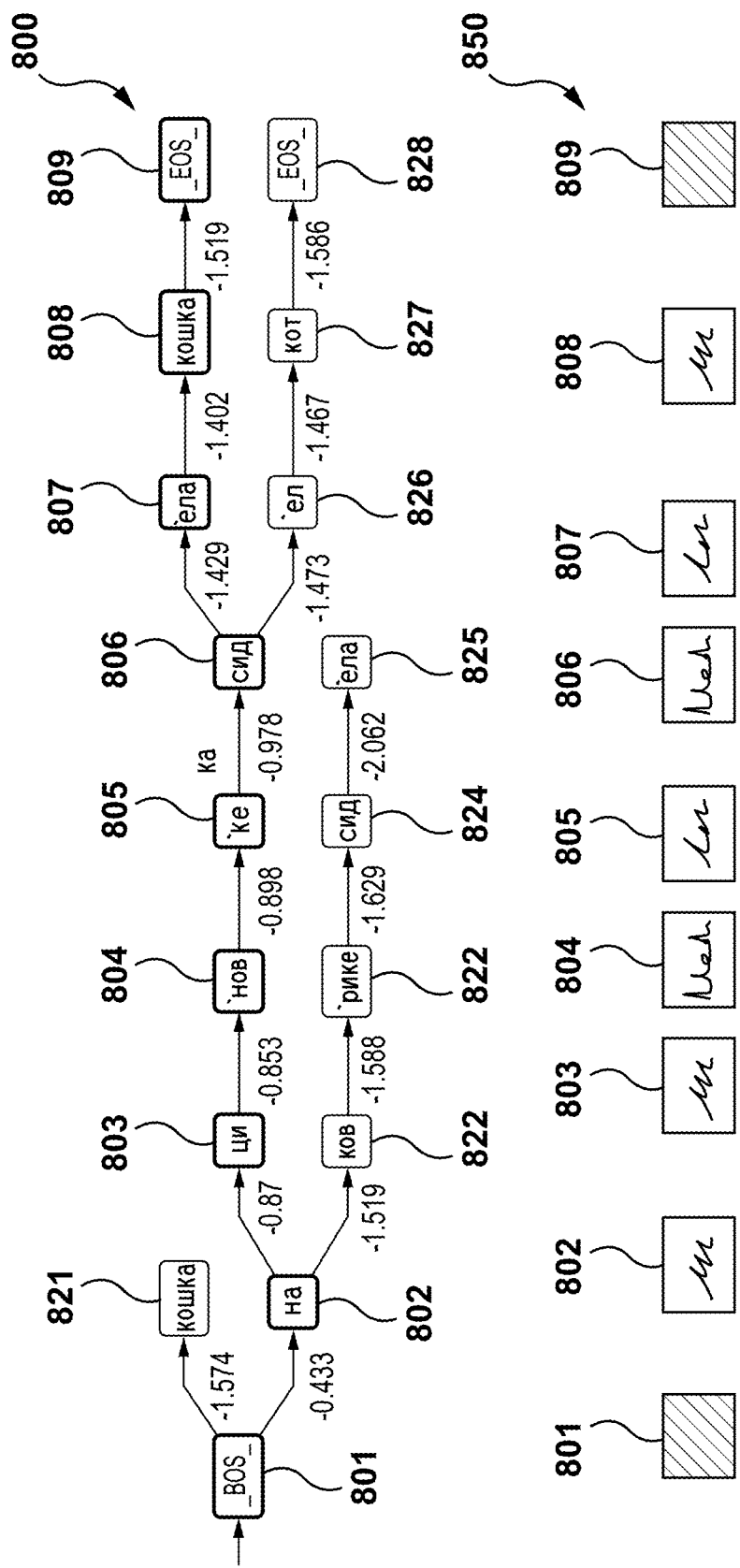
FIG. 8 depicts an example of a beam search graph for a NMT model translating an input sentence, trained in accordance with conventional methods, and using beam search.
Figure 9:
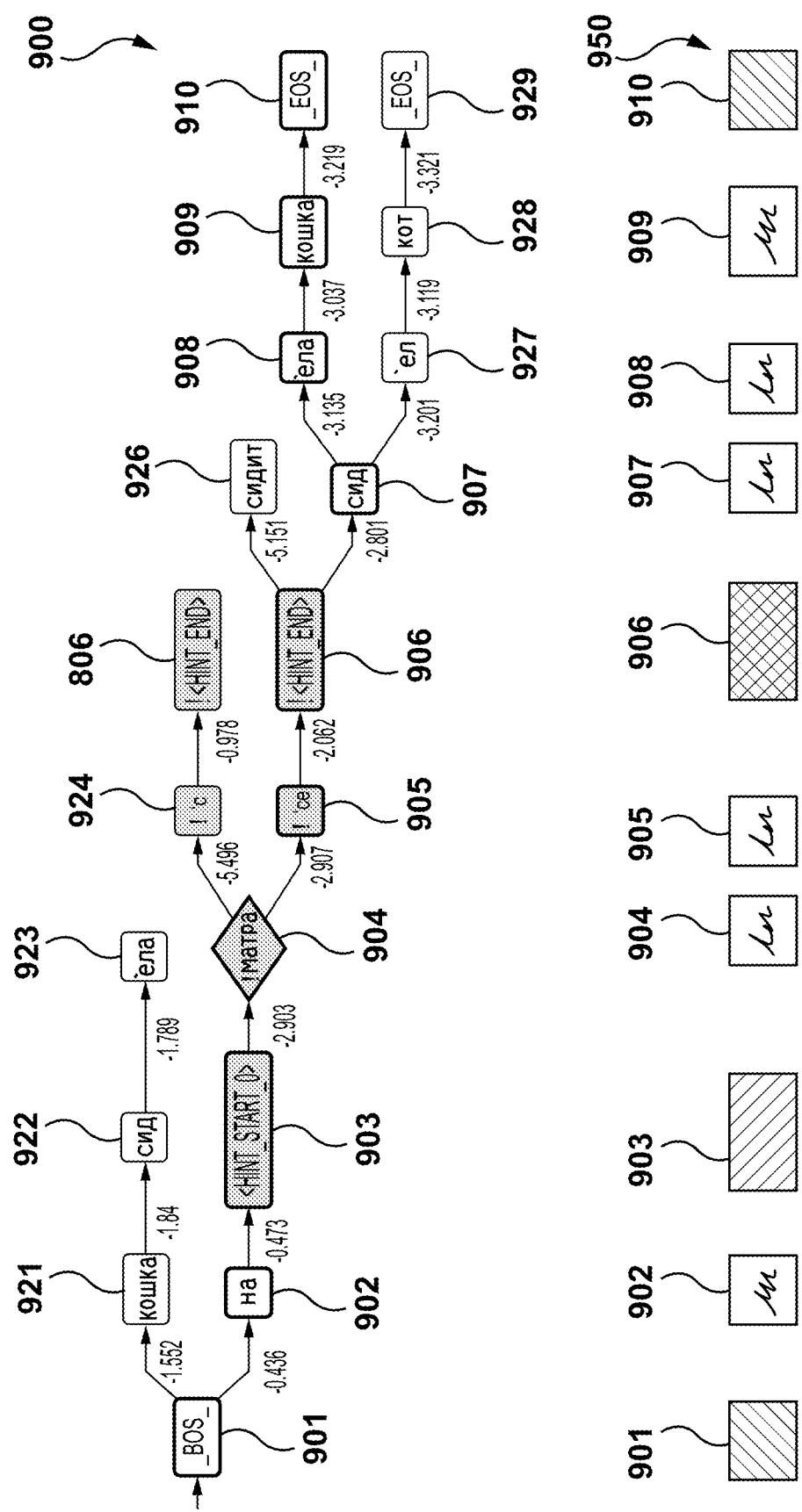
FIG. 9 depicts an example of a beam search graph for an NMT model translating an input sentence, trained in accordance with the HBD framework, and using beam search and a hint, in accordance with some non-limiting embodiments of the present technology.

With reference to FIG. 7, there is illustrated a number of iterations of the iterative generation process of the sequence of output tokens 640. During an iteration 701, a decoder portion of the translation model 120 generates a given output token (not numbered). During an iteration 702 (a next iteration), the translation model 120 generates the output start token 641. In response to the server 112 determining that the output token generated during the iteration 702 is a given "special" start token, the server 112 is configured to apply a constraining condition on a then-next output token(s) to be generated by the translation model 120 for the sequence of output tokens 640 such that the then-next output token(s) is the token representative of a domain-specific translation of the given word.

In some embodiments of the present technology, it can be said that the server 112 may be configured to apply the constraint during inference. For example, the server 112 may be configured to generate a "whitelist" of sub-sequences of tokens that correspond to one or more domain-specific translation of the word 615. The whitelist may be generated based on one or more forms of a given domain-specific translation from the domain-specific vocabulary 140. It is contemplated that a number of sub-sequences of tokens in the whitelist may correspond to a number of forms of a domain-specific translation. In further embodiments, it is contemplated that sub-sequences in the whitelist may include tokens representative a domain-specific translation and followed by a special end token.

Hence, in some embodiments, when the server 112 determines that a special start token is generated, the server 112 may constrain the translation model 120 to generate at least one of the sub-sequences of tokens from the whitelist. As a result, in these embodiments, the translation model 120 generates one or more tokens representative of a domain-specific translation of the word 615 and followed by the special end token.

In the illustrated non-limiting embodiment, during an iteration 703 (next to the iteration 702), the decoder portion of the translation model 120 is constrained to generate the output token 625. In some embodiments, the translation-hint token 633 may carry information indicative of the output token 625. In other embodiments, the information about the output token 625 may be provided by the server 112 (e.g., the whitelist). As such, after the iteration 704, the then-next output token in the sequence of output tokens 640 is the output token 625 being a token representative of a domain-specific translation of the given word (represented by the input token 615).

In some embodiments, the translation model 120 may perform a number of so-constrained iterations for generating a set of output tokens representative of a domain-specific translation of a given word in an input sentence. In one non-limiting example, if the whitelist includes a single sub-sequence of tokens that includes five tokens, the translation model 120 may be constrained to generate four tokens representative of the domain-specific translation and followed by the fifth token representative of the special end token.

It should be noted that in those embodiments where more than one forms of the domain-specific translation exist, and therefore more than one whitelisted sub-sequences of tokens, the translation model 120 may generate a given one of the whitelisted sub-sequences of tokens in the sequence of output tokens based on the respective probabilities of being a best continuation of a currently generated sequence of output tokens. For example, a beam search algorithm may be applied to determine the generation of which whitelisted sub-sequence of tokens in the sequence of output tokens would yield a better translation.

In the illustrated non-limiting embodiment, during an iteration 704, the decoder portion of the translation model 120 is configured to generate the output end token 642. In response to the server 112 determining that the output token generated during the iteration 704 is a given "special" end token, the server 112 is configured to stop applying the constraining condition on a then-next output token to be generated by the translation model 120. It can be said that the occurrence of the special end token in a given sequence of output tokens indicates that the domain-specific translation of the given word has been terminated, and therefore, the translation model 120 may resume generation of output tokens without the constraining condition.

During an iteration 705 (next to the iteration 704), the decoder portion of the translation model 120 generates another given output token (not numbered) without constraint. As a result, after the iteration 704, the then-next output token is no longer constrained to be a token representative of a domain-specific translation.

Once the decoder portion of the translation model 120 generates an EOS token marking an end of the sequence of output tokens 640, the server 112 may use the sequence of output tokens 640 to generate a second sentence in the second language (i.e., the target language). For example, the server 112 may be configured to remove one or more special tokens from the sequence of output tokens 640 and use the rest for generating the second sentence. The server 112 may remove a BOS special token, the output start token 641, the output end token 642, and the EOS special token from the sequence of output tokens 640. The server 112 may use the remaining output tokens (which includes the output token 625) in the sequence of output tokens 640 for generating the second sentence which include the domain-specific translation of the given word in the input sentence.

In some embodiments of the present technology, it is contemplated that more than one given word may be identified in a source sentence for provision of domain-specific translations thereof. In these embodiments, input tokens of each one of such given words may be "wrapped" via special tokens. In these embodiments, it is contemplated that the decoder portion of the translation model 120 may generate more than one output start token and more than one output end token in a sequence of output tokens for applying constraints on respective portions of the sequence of output tokens.

Figure 10:
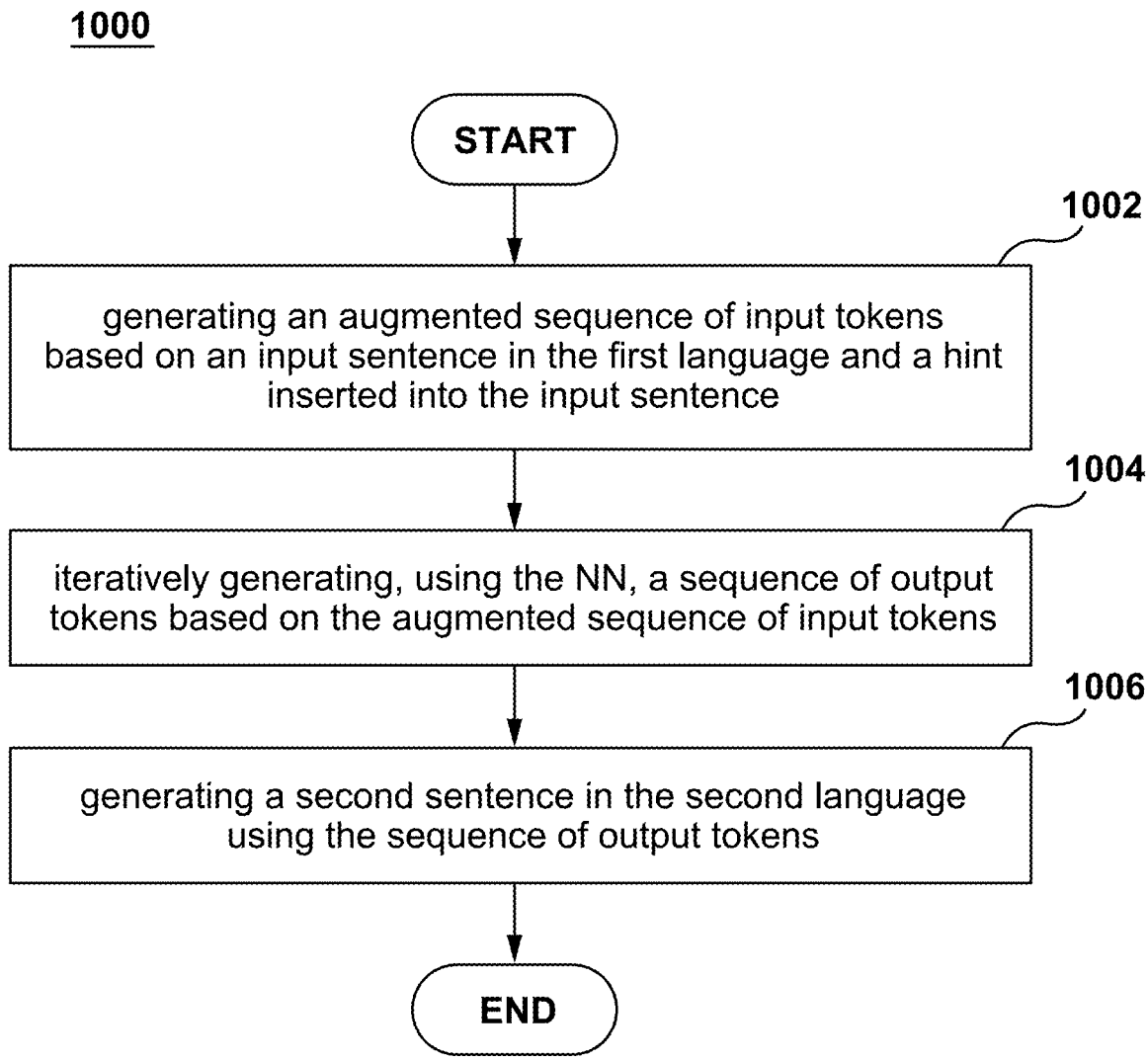
FIG. 10 is a schematic flowchart of a method executable in accordance with certain non-limiting embodiments of the present technology.

In some embodiments of the present technology, the server 112 is configured to execute a method 1000 illustrated in FIG. 10. Various steps of the method 1000 will now be discussed in greater details.

STEP 1002: Generating an Augmented Sequence of Input Tokens Based on an Input Sentence in the First Language and a Hint Inserted into the Input Sentence The method 1000 begins at step 1002, with the server 112 configured to generate an augmented sequence of input tokens based on an input sentence in the first language and a hint inserted into the input sentence.

For example, the input sentence 610 has the word 615 that is represented in the augmented sequence of input tokens 630 as the input token 635. The hint is represented in the augmented sequence of input tokens 630 as the input start token 631 and the input end token 632. The input start token 631 is inserted at a position preceding the input token 635 and the input end token 632 is inserted at a position following the input token 635 for identifying which input token in the augmented sequence of input tokens is the input token 635.

In some embodiments, the hint is further represented in the augmented sequence of input tokens 630 as the translation-hint special token 633 and the other given token 645. In these embodiments, the translation-hint special token 633 and the other given token 645 re inserted after the input token 635 and before the input end token 632.

In other embodiments, the input token 635 may be a sub-sequence of input tokens, the input word 615 may be represented by the sub-sequence of input tokens in the augmented sequence of input tokens 630. In further embodiments, the other given token 645 is an other sub-sequence of tokens, and the domain-specific translation 625 being represented by the other sub-sequence of tokens. It is contemplated that a plurality of domain-specific translations of the given input word may include grammatical variants of the given input word.

STEP 1004: Iteratively Generating, Using the NN, a Sequence of Output Tokens Based on the Augmented Sequence of Input Tokens The method 1000 continues to step 1004 with the server 112 configured to generate using the NN a sequence of output tokens based on the augmented sequence of input tokens.

For example, the server 112 may be configured to use the translation model 120 for generating the sequence of output tokens 640 based on the augmented sentence of input tokens 630. In some embodiments, the sequence of output tokens 640 may be further based on a given whitelisted sub-sequence of tokens.

During the iterative generation process, in response to generating the output start token 641, the server 112 is configured to apply a constraining condition on a then-next output token to be generated by the NN such that the then-next output token is the other given token 645. During the iterative generation process, in response to generating the output end token 642, the server 112 is configured to stop applying the constraining condition on a then-next token to be generated by the NN.

In some cases, the domain-specific vocabulary includes a plurality of the domain-specific translations of the given input word. In this cases, the server 112 may be configured to apply the constraining condition on a then-next sub-sequence of output tokens to be generated by the NN such that the then-next sub-sequence of output tokens is one of the plurality of other sub-sequences of tokens representing the plurality of domain-specific translations.

In further embodiments, the applying the constraining condition comprises the server 112 accessing a whitelisted sub-sequence of tokens including the other given token and the special end token and constraining the translation model 120 to generate the whitelisted sub-sequence of tokens as the then-next output token.

STEP 1006: Generating a Second Sentence in the Second Language Using the Sequence of Output Tokens The method 1000 continues to step 1006 with the server 112 generating a second sentence in the second language using the sequence of output tokens. The second sentence includes the domain-specific translation of the input word 615. For example, the server 112 may be configured to filter out one or more tokens from the sequence of output tokens 640 that correspond to special tokens.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training, by at least one server comprising at least one memory and at least one processor, a transformer model for performing translation from a first language to a second language, the transformer model having an encoder and a decoder, the at least one server executing the transformer model, the method comprising:
   during a training phase:
      generating, by the at least one server, an augmented sequence of first tokens based on a first sentence in the first language and a first hint inserted into the first sentence,
      the first sentence having a first word, the first word being represented in the augmented sequence of first tokens as a given first token, the first hint being represented in the augmented sequence of first tokens as a first start token and a first end token,
      the first start token being inserted at a position preceding the given first token and the first end token being inserted at a position following the given first token for identifying which first token in the augmented sequence of first tokens is the given first token;
   generating, by the at least one server, an augmented sequence of second tokens based on a second sentence in the second language and a second hint inserted into the second sentence, the second sentence being a translation of the first sentence,
      the second sentence having a second word, the second word being a domain-specific translation of the first word, the second word being represented in the augmented sequence of second tokens as a given second token, the second hint being represented in the augmented sequence of second tokens as a second start token and a second end token,
      the second start token being inserted at a position preceding the given second token and the second end token being inserted at a position following the given second token for identifying which second token in the augmented sequence of second tokens is the given second token;
   training, by the at least one server, the transformer model by providing the augmented sequence of first tokens to the encoder and the augmented sequence of second tokens to the decoder, so as to train the decoder to generate an output start token and an output end token at correct positions in a sequence of output tokens.

2. The method of claim 1, wherein the method further comprises, during an in-use phase of the transformer model:
   iteratively generating, by the at least one server using the transformer model, an augmented sequence of output tokens based on an augmented sequence of input tokens, and during the iteratively generating:
      in response to generating an output start token in a sequence of output tokens during a given iteration, applying a constraining condition on a then-next output token to be generated by the transformer model for the augmented sequence of output tokens such that the then-next output token is a domain-specific translation represented as a token;
      in response to generating the output end token during another given iteration, stopping the applying the constraining condition on a then-output next token to be generated by the transformer model; and
   generating, by the at least one server, a sentence in the second language using the augmented sequence of output tokens.

3. The method of claim 2, wherein
   applying the constraining condition on the then-next output token comprises identifying a plurality of domain-specific translations of an input word corresponding to the augmented sequence of input tokens and wherein the then-next output token corresponds to one of the plurality of domain-specific translations.

4. The method of claim 3, wherein the plurality of the domain-specific translations of the input word includes grammatical variants of the input word.

5. A server for training a transformer model for performing translation from a first language to a second language, the transformer model having an encoder and a decoder, the server running the transformer model, the server comprising at least one processor and memory comprising executable instructions, which, when executed by the at least one processor, cause the server to:

during a training phase:

generate an augmented sequence of first tokens based on a first sentence in the first language and a first hint inserted into the first sentence, the first sentence having a first word, the first word being represented in the augmented sequence of first tokens as a given first token, the first hint being represented in the augmented sequence of first tokens as a first start token and a first end token, the first start token being inserted at a position preceding the given first token and the first end token being inserted at a position following the given first token for identifying which first token in the augmented sequence of first tokens is the given first token;

generate an augmented sequence of second tokens based on a second sentence in the second language and a second hint inserted into the second sentence, the second sentence being a translation of the first sentence, the second sentence having a second word, the second word being a domain-specific translation of the first word, the second word being represented in the augmented sequence of second tokens as a given second token, the second hint being represented in the augmented sequence of second tokens as a second start token and a second end token, the second start token being inserted at a position preceding the given second token and the second end token being inserted at a position following the given second token for identifying which second token in the augmented sequence of second tokens is the given second token;

train the transformer model by providing the augmented sequence of first tokens to the encoder and the augmented sequence of second tokens to the decoder, so as to train the decoder to generate an output start token and an output end token at correct positions in a sequence of output tokens.

6. The server of claim 5, wherein the executable instructions further cause the server to, during an in-use phase of the transformer model:

iteratively generate, using the transformer model, an augmented sequence of output tokens based on an augmented sequence of input tokens, and during the iteratively generating:

in response to generating an output start token in the sequence of output tokens during a given iteration, apply a constraining condition on a then-next output token to be generated by the transformer model for the augmented sequence of output tokens such that the then-next output token is a domain-specific translation represented as a token;

in response to generating the output end token during another given iteration, stop the applying the constraining condition on a then-output next token to be generated by the transformer model; and generate a second sentence in the second language using the augmented sequence of output tokens.

7. The server of claim 6, wherein the instructions that cause the server to apply the constraining condition comprise instructions that cause the server to identify a plurality of domain-specific translations of an input word corresponding to the augmented sequence of input tokens.

8. The server of claim 7, wherein the plurality of the domain-specific translations of the input word includes grammatical variants of the input word.

* * * * *